United States Patent
Hayzen et al.

(10) Patent No.: US 11,898,994 B2
(45) Date of Patent: *Feb. 13, 2024

(54) WAVEFORM ACQUISITION OPTIMIZATION

(71) Applicant: Computational Systems, Inc., Knoxville, TN (US)

(72) Inventors: Anthony J. Hayzen, Knoxville, TN (US); Jim W. Walker, Knoxville, TN (US)

(73) Assignee: Computational Systems, Inc., Knoxville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/964,077

(22) Filed: Oct. 12, 2022

(65) Prior Publication Data

US 2023/0043980 A1 Feb. 9, 2023

Related U.S. Application Data (63) Continuation of application No. 16/354,520, filed on Mar. 15, 2019, now Pat. No. 11,499,946.

(51) Int. Cl.
*G01N 29/46* (2006.01)
*G01N 29/14* (2006.01)

(52) U.S. Cl.
CPC ............ *G01N 29/46* (2013.01); *G01N 29/14* (2013.01); *G01N 2291/014* (2013.01); *G01N 2291/0289* (2013.01)

(58) Field of Classification Search
None
See application file for complete search history.

(56) References Cited

U.S. PATENT DOCUMENTS

| | | | |
|---|---|---|---|
| 6,549,869 B1 * | 4/2003 | Piety | G01H 1/003 |
| | | | 702/56 |
| 2018/0347548 A1 * | 12/2018 | Potter | G01M 13/045 |

* cited by examiner

*Primary Examiner* — Matthew G Marini
(74) *Attorney, Agent, or Firm* — Luedeka Neely, P.C.

(57) ABSTRACT

A computer-implemented process determines, based on bearing fault frequencies, optimum values for the maximum frequency ($F_{max}$) and the number of lines of resolution ($N_{lines}$) to be used in collecting machine vibration data so as to adequately distinguish between spectral peaks for identifying faults in machine bearings. The process can be extended to any other types of fault frequencies that a machine may exhibit, such as motor fault frequencies, pump/fan fault frequencies, and gear mesh fault frequencies. Embodiments of the process also ensure that the time needed to acquire the waveform is optimized. This is particularly useful when collecting data using portable vibration monitoring devices.

14 Claims, 12 Drawing Sheets

| Un-Resolveable Peaks | | | |
|---|---|---|---|
| Freq | Peak | Freq | Peak |
| 120 | 2 x TS | 120.00000018 | 5 x FTF |
| 144.00000216 | 6 x FTF | 144.00000057 | 1 x BSF |
| 168.00000025 | 7 x FTF | 168.00000061 | 1 x BSF High |
| 360 | 1 x BPFO | 360 | 6 x TS |
| 480 | 1 x BPFI Low | 480 | 8 x TS |
| 540 | 9 x TS | 540 | 1 x BPFI |
| 600 | 1 x BPFI High | 600 | 10 x TS |
| 720 | 12 x TS | 720 | 2 x BPFO |
| 1080 | 2 x BPFI | 1080 | 3 x BPFO |
| 2160 | 6 x BPFO | 2160 | 4 x BPFI |
| 3240 | 9 x BPFO | 3240 | 6 x BPFI |

| Un-Resolveable Peaks | | Resolveable Peaks | |
|---|---|---|---|
| Freq | Peak | Freq | Peak |
| 183.5999966 | 1 x BPFO | 45.95744848 | 2 x FTF |
| | | 60 | 1 x TS |
| | | 68.93617272 | 3 x FTF |
| | | 91.91489697 | 4 x FTF |
| | | 97.62127519 | 1 x BSF Low |
| | | 114.8936212 | 5 x FTF |
| | | 120 | 2 x TS |
| | | 120.5999994 | 1 x BSF |
| | | 137.8723454 | 6 x FTF |
| | | 143.5787237 | 1 x BSF High |
| | | 160.8510697 | 7 x FTF |
| | | 180 | 3 x TS |
| | | 183.8297939 | 8 x FTF |
| | | 206.8085182 | 9 x FTF |
| | | 218.2212746 | 2 x BSF Low |
| | | 235.7999897 | 1 x BPFI Low |
| | | 240 | 4 x TS |
| | | 241.1999989 | 2 x BSF |
| | | 264.1787231 | 2 x BSF High |
| | | 295.7999897 | 1 x BPFI |
| | | 300 | 5 x TS |
| | | 338.821274 | 3 x BSF Low |
| | | 355.7999897 | 1 x BPFI High |
| | | 360 | 6 x TS |
| | | 361.7999983 | 3 x BSF |
| | | 367.1999931 | 2 x BPFO |
| | | 384.7787225 | 3 x BSF High |
| | | 420 | 7 x TS |
| | | 459.4212735 | 4 x BSF Low |
| | | 480 | 8 x TS |
| | | ... | ... |

Optimized

- $TS = 60 Hz$
- $F_{max} = 2500$
- $N_{lines} = 25600$
- $\Delta f = 0.976 Hz$
- Time = 10.24 sec
- Un-Resolved Peaks = 0
- Resolved Peaks = 81

*FIG. 6A*

| Un-Resolveable Peaks | | Resolveable Peaks | | | |
|---|---|---|---|---|---|
| Freq | Peak | Freq | Peak | Freq | Peak |
| 114.8936212 | 5 x FTF | 120 | 2 x TS | 22.97872424 | 1 x FTF |
| 180 | 3 x TS | 183.5999966 | 1 x BPFO | 45.95744848 | 2 x FTF |
| 235.7999897 | 1 x BPFI Low | 240 | 4 x TS | 60 | 1 x TS |
| 295.7999897 | 1 x BPFI | 300 | 5 x TS | 68.93617272 | 3 x FTF |
| 355.7999897 | 1 x BPFI High | 360 | 6 x TS | 91.91489697 | 4 x FTF |
| 361.7999983 | 3 x BSF | 367.1999931 | 2 x BPFO | 97.62127519 | 1 x BSF Low |
| 480 | 8 x TS | 482.3999977 | 4 x BSF | 120.5999994 | 1 x BSF |
| 600 | 10 x TS | 602.9999971 | 5 x BSF | 137.8723454 | 6 x FTF |
| 720 | 12 x TS | 723.5999966 | 6 x BSF | 143.5787237 | 1 x BSF High |
| 941.8212712 | 8 x BSF Low | 947.3999691 | 3 x BPFI High | 160.8510697 | 7 x FTF |
| | | | | 183.8297939 | 8 x FTF |
| | | | | 206.8085182 | 9 x FTF |
| | | | | 218.2212746 | 2 x BSF Low |
| | | | | 241.1999989 | 2 x BSF |
| | | | | 264.1787231 | 2 x BSF High |
| | | | | 338.821274 | 3 x BSF Low |
| | | | | 384.7787225 | 3 x BSF High |
| | | | | 420 | 7 x TS |
| | | | | 459.4212735 | 4 x BSF Low |
| | | | | 505.378722 | 4 x BSF High |
| | | | | 531.5999794 | 2 x BPFI Low |
| | | | | 540 | 9 x TS |
| | | | | 550.7999897 | 3 x BPFO |
| | | | | 580.0212729 | 5 x BSF Low |
| | | | | 591.5999794 | 2 x BPFI |
| | | | | 625.9787214 | 5 x BSF High |
| | | | | 651.5999794 | 2 x BPFI High |
| | | | | 660 | 11 x TS |
| | | | | 700.6212723 | 6 x BSF Low |
| | | | | 734.3999863 | 4 x BPFO |
| | | | | 746.5787208 | 6 x BSF High |

"Rule of Thumb"
- $TS = 60 Hz$
- $F_{max} = 4500$
- $N_{lines} = 1600$
- $\Delta f = 2.8125 Hz$
- $Time = 0.36$
- Un-Resolved Peaks = 20
- Resolved Peaks = 61

WAVEFORM ACQUISITION OPTIMIZATION

FIELD

This invention relates to the field of machine vibration data analysis. More particularly, this invention relates to a system for optimizing the collection of machine vibration data to enhance spectral waveform analysis.

BACKGROUND

In acquiring machine vibration data for spectral analysis, it is necessary to collect the data over a sufficient frequency range and with sufficient resolution to adequately distinguish between various spectral amplitude peaks, thereby enabling the identification of peaks associated with potential machinery faults. This requires defining the correct maximum frequency ($F_{max}$) and the correct number of lines of resolution ($N_{lines}$) in configuring the vibration monitoring device that collects the data, such as the Emerson model AMS 2140 Machinery Health Analyzer.

What is needed, therefore, is a process for determining an $F_{max}$ value and an $N_{lines}$ value to be used in configuring a vibration data collection device to acquire machine vibration data that will be sufficient for use in identifying spectral amplitude peaks associated with machine fault frequencies.

SUMMARY

The above and other needs are met by a process that determines, based on bearing fault frequencies, the optimum values for the maximum frequency ($F_{max}$) and the number of lines of resolution ($N_{lines}$) to be used in collecting machine vibration data so as to adequately distinguish between spectral peaks for identifying faults in machine bearings. The process can be extended to any other types of fault frequencies that a machine may exhibit, such as motor fault frequencies, pump/fan fault frequencies, and gear mesh fault frequencies. Embodiments of the process also ensure that the time needed to acquire the waveform is optimized. This is particularly useful when collecting data using portable vibration monitoring devices.

Preferred embodiments provide a method implemented by a computer processor for configuring a vibration data collection device to acquire machine vibration data for use in generating a vibration spectrum. The vibration spectrum has amplitude peaks at a plurality of fault frequencies that are indicative of faults in the machine. In one embodiment, the method includes the following steps:

(a) determining a maximum frequency of data collection;
(b) determining a minimum frequency spacing within the plurality of fault frequencies;
(c) based on the maximum frequency and the minimum frequency spacing, determining a number of lines of resolution that will allow identification of all of the amplitude peaks associated with each of the plurality of fault frequencies that are resolvable given limitations of the vibration data collection device; and
(d) configuring the vibration data collection device using the maximum frequency and the number of lines of resolution.

In some embodiments, step (a) of the method includes specifying a number N of harmonics of the turning speed and a number M of harmonics of the plurality of fault frequencies to be included in the vibration spectrum, and determining the maximum frequency based at least in part on the number N.

In some embodiments, the method includes, prior to steps (a) and (b):

calculating N number of turning speed frequencies associated with the N number of harmonics of the turning speed; and calculating M number of fault frequencies associated with the M number of harmonics of the plurality of fault frequencies.

In these embodiments, step (a) includes determining the maximum frequency based at least in part on a highest frequency of the N number of turning speed frequencies and the M number of fault frequencies, and step (b) includes determining the minimum frequency spacing within the N number of turning speed frequencies and the M number of fault frequencies.

In some embodiments, step (a) of the method includes:

(a1) accessing from a memory device a list of discrete maximum frequency values at which the vibration data collection device is operable;

(a2) comparing one or more of the discrete maximum frequency values to the highest frequency of the N number of turning speed frequencies and the M number of fault frequencies;

(a3) based on the comparing of step (a2), determining a largest one of the discrete maximum frequency values that is less than or equal to the highest frequency of the N number of turning speed frequencies and the M number of fault frequencies; and (a4) setting the maximum frequency to be equal to the largest one of the discrete maximum frequency values determined in step (a3).

In some embodiments, step (a) of the method also includes:

(a5) accessing a memory device to determine a device maximum frequency value at which the vibration data collection device is operable;

(a6) comparing the device maximum frequency value to the maximum frequency set in step (a4); and (a7) if the maximum frequency set in step (a4) is greater than the device maximum frequency value, setting the maximum frequency to be equal to the device maximum frequency value.

In some embodiments, if the maximum frequency is set to be equal to the device maximum frequency value, the method includes:

determining a number of amplitude peaks associated with unresolved fault frequencies based on the maximum frequency and the number of lines of resolution; and generating a listing of the amplitude peaks associated with unresolved fault frequencies.

In some embodiments, step (c) of the method includes calculating $$N_{lines} = \frac{2 \times F_{max}}{\Delta f},$$

where $N_{lines}$ is a calculated number of lines of resolution, $F_{max}$ is the maximum frequency, and $\Delta f$ is the minimum frequency spacing.

In some embodiments, step (c) of the method includes:

(c1) accessing from a memory device a list of discrete number of lines of resolution values at which the vibration data collection device is operable;

(c2) comparing one or more of the discrete number of lines of resolution values to the calculated number of lines of resolution;

(c3) based on the comparing of step (c2), determining a largest one of the discrete number of lines of resolution values that is less than or equal to the calculated number of lines of resolution; and (c4) setting the number of lines of resolution to be equal to the largest one of the discrete number of lines of resolution values determined in step (c3).

In some embodiments, step (c) of the method includes:

(c5) accessing a memory device to determine a device maximum number of lines of resolution value at which the vibration data collection device is operable;

(c6) comparing the device maximum number of lines of resolution value to the number of lines of resolution set in step (c4); and (c7) if the number of lines of resolution set in step (c4) is greater than the device maximum number of lines of resolution value, setting the number of lines of resolution to be equal to the device maximum number of lines of resolution value.

In some embodiments, if the number of lines of resolution is set to be equal to the device maximum number of lines of resolution value, the method includes:

determining a number of amplitude peaks associated with unresolved fault frequencies based on the maximum frequency and the number of lines of resolution; and generating a listing of the amplitude peaks associated with unresolved fault frequencies.

In some embodiments, the method includes determining a minimum waveform data acquisition time, which is a smallest amount of time during which the vibration data collection device can acquire vibration data without increasing a number of amplitude peaks associated with unresolved fault frequencies.

In some embodiments, the minimum waveform data acquisition time is calculated according to $$T_{acq} = \frac{N_{lines}}{F_{max}},$$

where, $T_{acq}$ is the minimum waveform data acquisition time, $N_{lines}$ is the number of lines of resolution, and $F_{max}$ is the maximum frequency.

In some embodiments, the minimum waveform data acquisition time is determined by:

(e) determining a value nines according to $$M_{lines} = \frac{N_{lines}}{2},$$

where $N_{lines}$ is the number of lines of resolution;

(f) based on the value $M_{lines}$ and the maximum frequency, determining a temporary value $N_{tmp}$ for the number of amplitude peaks associated with unresolved fault frequencies $N_{unres}$;

(g) if $N_{tmp}$ is greater than $N_{unres}$, then setting $N_{lines}$ equal to $2 \times M_{lines}$, and determining the minimum waveform data acquisition time $T_{acq}$ according to $$T_{acq} = \frac{N_{lines}}{F_{max}},$$

and if $N_{tmp}$ is not greater than $N_{unres}$, then setting $N_{lines}$ equal to $$\frac{N_{lines}}{2},$$

and repeating steps (f) and (g) until $N_{tmp}$ is greater than $N_{unres}$; and (h) configuring the data collection device using the minimum waveform data acquisition time.

In some embodiments, the method includes:

calculating N number of turning speed frequencies associated with the N number of harmonics of the turning speed;

and calculating M number of fault frequencies associated with the M number of harmonics of the plurality of fault frequencies; and generating a graphic display of the N number of turning speed frequencies and the M number of fault frequencies.

In some embodiments, the method is performed by a computer processor that is a component of the data collection device.

In another aspect, the invention provides a method implemented by a computer processor for configuring a vibration data collection device to acquire machine vibration data from a machine for use in generating a vibration spectrum. A preferred embodiment of the method includes the following steps:

(a) determining a maximum frequency of data collection;

(b) determining a minimum frequency spacing within a plurality of fault frequencies;

(c) based on the maximum frequency and the minimum frequency spacing, determining a number of lines of resolution of data collection according to $$N_{lines} = \frac{2 \times F_{max}}{\Delta f},$$

where $N_{lines}$ is a calculated number of lines of resolution, $F_{max}$ is the maximum frequency, and $\Delta f$ is the minimum frequency spacing;

(d) configuring the vibration data collection device using the maximum frequency and the number of lines of resolution;

(e) determining a minimum waveform data acquisition time $T_{acq}$ according to $$T_{acq} = \frac{N_{lines}}{F_{max}};$$

and (f) configuring the vibration data collection device using the maximum frequency, the number of lines of resolution, and the minimum waveform data acquisition time.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
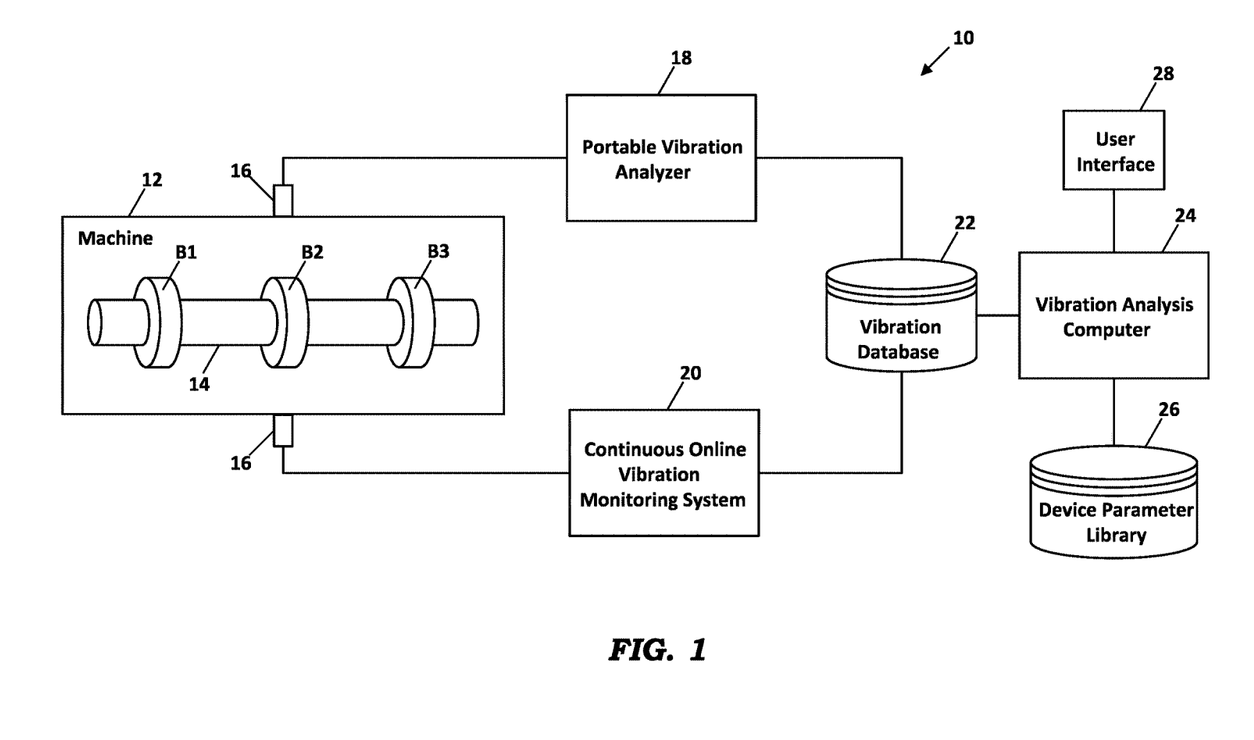
FIG. 1 depicts a vibration data collection and analysis system according to an embodiment of the invention.

As depicted in FIG. 1, a vibration data collection and analysis system 10 includes vibration sensors 16 attached to a machine 12. The machine 12 includes at least one rotating component 14, such as a shaft, supported by bearings B1, B2, and B3. The vibration sensors 16 generate vibration signals representative of the vibration of the machine 12, which include vibration components associated with the bearings B1, B2, and B3. The vibration signals are received, conditioned, and converted to time waveform digital data by one or more vibration data collectors, such as a portable vibration analyzer 18 or a continuous online vibration monitoring system 20. The vibration data collectors 18 and 20 include signal conditioning circuitry and analog-to-digital conversion circuitry for conditioning the vibration signals from the sensors 16 and generating the time waveform digital vibration data based thereon.

In preferred embodiments, the portable vibration analyzer 18 or the continuous online vibration monitoring system 20 include a processor that performs a Fast Fourier Transform (FFT) on the vibration time waveform data to generate vibration spectral data.

The vibration time waveform data and vibration spectral data are preferably stored in a vibration database 22 from which the data are available for analysis by software routines executed on a vibration analysis computer 24. The system 10 preferably includes a device parameter library 26 in which are stored lookup tables of device setup parameters for various types of vibration data collection devices, such as the maximum values of $F_{max}$ and $N_{lines}$. In preferred embodiments, the system 10 includes a user interface 28, such as a touch screen, that allows a user to view measurement results, select certain measurement parameters, and provide other input as described herein.

Before collecting vibration data using the system 10, a preferred embodiment implements a process that determines optimum values for certain data collection parameters used in configuring the vibration data collectors 18 and 20. The process may be performed by a processor that is a component of the data collection device (such as 18 or 20 in FIG. 1) or that is a component of vibration analysis computer 24. A preferred embodiment of the process first calculates potential bearing fault frequency peaks by specifying the number of harmonics for each type of bearing fault frequency that could be exhibited, and setting a maximum frequency based thereon. The process then determines the minimum frequency gap between any two peaks. These two pieces of information are used to determine values for the maximum frequency ($F_{max}$) and the number of lines of resolution ($N_{lines}$) described in more detail hereinafter. Once $F_{max}$ and $N_{lines}$ have been lines, determined, the frequency resolution of the vibration spectrum is given by $$\Delta f = F_{max}/N_{lines},$$

and the data acquisition time is given by $$T_{acq} = N_{lines}/F_{max}.$$

Figure 2:
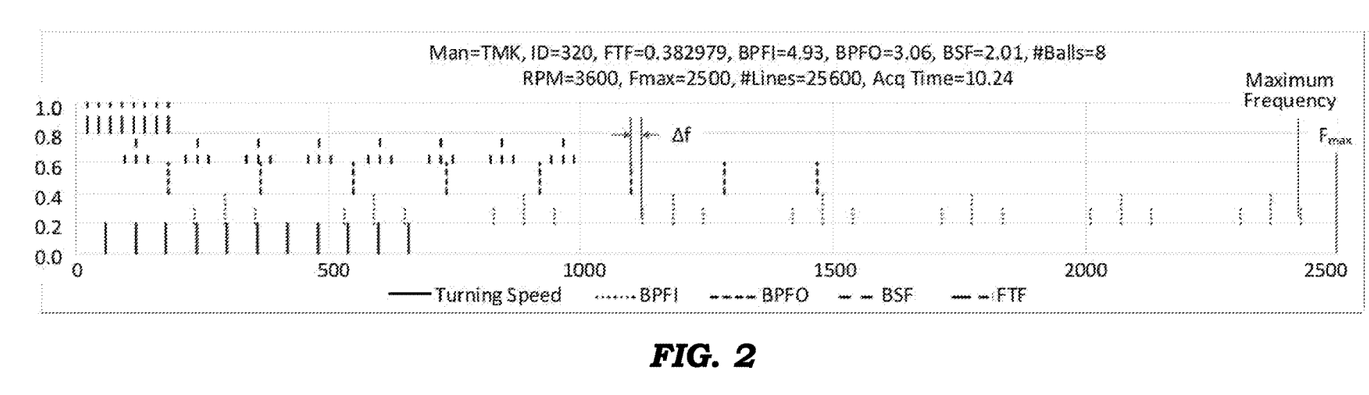
FIG. 2 depicts a graphical plot of frequencies associated with a machine's turning speed and several types of bearing faults according to an embodiment of the invention.

To determine $F_{max}$ and $N_{lines}$, an initial step is setting the number of orders for each potential type of bearing fault frequency (turning speed, Ball Pass Frequency Inner Race (BPFI), Ball Pass Frequency Outer Race (BPFO), Ball Spin Frequency (BSF), Fundamental Train Frequency (FTF)). The number of orders is typically ten for the turning speed and seven for the bearing fault frequencies. This determines the maximum frequency required in the spectra from which $F_{max}$ is derived from a set of discrete values. FIG. 2 graphically depicts the various fault frequencies associated with bearing faults.

With reference to FIG. 2, the next step is to determine the minimum frequency spacing ($\Delta f$) between all of the fault frequencies, other than for the case of two fault frequencies coinciding. The number of spectral lines of resolution $N_{calc}$ is then calculated, assuming at least one spectral bin between peaks. $N_{calc}$ is then used to determine the number of lines of resolution $N_{lines}$ from a set of discrete values.

It will be appreciated that the number of bins between spectral peaks can be increased, for example to take Hanning window effects into account.

Figure 3:
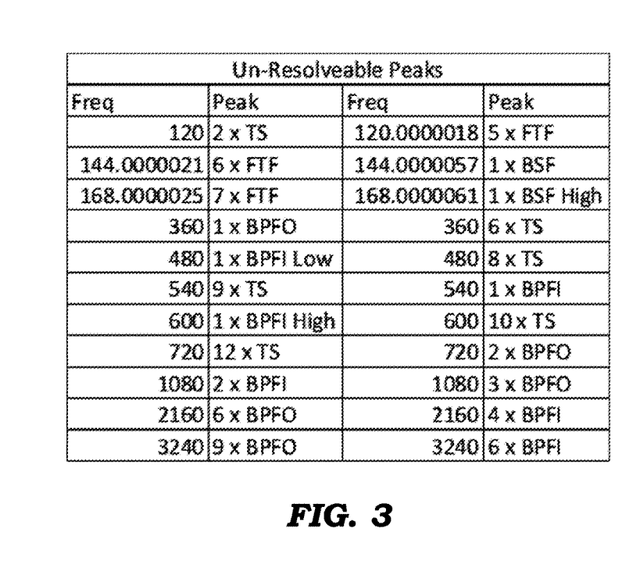
FIG. 3 depicts a table of unresolvable peaks and peak frequencies associated with a machine's turning speed and several types of bearing faults according to an embodiment of the invention.

Because $N_{lines}$ and $F_{max}$ are discrete values that have limited ranges, there may be certain fault frequencies that cannot be resolved. Examples of such frequencies are listed in the table of FIG. 3.

As noted above, the waveform data acquisition time ($T_{acq}$) may then be calculated as $$T_{acq} = N_{lines}/F_{max}.$$

The time $T_{acq}$ may be optimized to minimize the data acquisition time without increasing the number of unresolved fault frequencies.

Optimizing $F_{max}$

In the example depicted in FIG. 2, if $F_{max}$ is reduced by half, only a few of the BPFI and BPFO harmonic peaks would be lost. If $N_{lines}$ is unchanged, reducing $F_{max}$ by half increases the frequency resolution by a factor of two (i.e., half of $\Delta f$). The consequence of this is doubling the acquisition time $T_{acq}$, although more peaks possibly are resolved due to the smaller $\Delta f$.

On the other hand, increasing $F_{max}$ while keeping $N_{lines}$ constant reduces the frequency resolution and decreases $T_{acq}$, in which case fewer peaks may be resolvable.

Optimizing $N_{lines}$

Increasing $N_{lines}$ while keeping $F_{max}$ constant increases the frequency resolution (i.e. reduces $\Delta f$), in which case more peaks may be resolvable. However, $T_{acq}$ would be increased.

Decreasing $N_{lines}$ while keeping $F_{max}$ constant decreases the frequency resolution (i.e., increases $\Delta f$), in which case fewer peaks may be resolvable and $T_{acq}$ is decreased.

Optimizing $T_{acq}$

Optimizing $T_{acq}$ is important for route-based portable vibration data collection devices in order to optimize total route time. However, it is also important for $T_{acq}$ to be long enough to collect useable data for machine diagnostics.

As indicated by the above discussion of optimizing $F_{max}$ and $N_{lines}$, $T_{acq}$ is dependent on both of those values. By adjusting $F_{max}$ and $N_{lines}$, $T_{acq}$ can be optimized to create a route having a total route time that is practical while ensuring most spectral peaks of interest are resolvable.

Situations may arise for some machines—slow turning machines in particular—in which the optimum $T_{acq}$ is too long for route-based portable vibration data collection devices, and lower resolution data is therefore collected. In these situations, once there is an indication that a fault may be developing, higher resolution data must be collected. This is typically not an issue for continuous online vibration monitoring systems.

"Rule of Thumb" Method for Determining $F_{max}$ and $N_{lines}$

A known "rule of thumb" method for estimating $F_{max}$ and $N_{lines}$ is defined as follows:

The bearing Fundamental Train Frequency (FTF) is estimated to be 0.4×TS, where TS is the turning speed in Hz.

The spectral frequency resolution $\Delta f$ is set to $$\frac{FTF}{6}.$$

$F_{max}$ is set to 70×TS $$N_{lines} = \frac{F_{max}}{\Delta f}$$

$$T_{acq} = \frac{N_{lines}}{F_{max}}$$

For example, if TS=60 Hz (3600 rpm) then $$FTF = 0.4 \times TS = 0.4 \times 60 \text{ Hz} = 24 \text{ Hz}$$

$$\Delta f = \frac{FTF}{6} = \frac{24 \text{ Hz}}{6} = 4 \text{ Hz}$$

$$F_{max} = 70 \times TS = 70 \times 60 = 4200 \text{ Hz (set to discrete device setting of 4500 Hz)}$$

$$N_{lines} = \frac{F_{max}}{\Delta f} = \frac{4200 \text{ Hz}}{4 \text{ Hz}} = 1050 \text{ (set to discrete device setting of 1600)}$$

$$T_{acq} = \frac{N_{lines}}{F_{max}} = \frac{1600}{4500 \text{ Hz}} = 0.36 \text{ seconds}$$

Figure 8A:
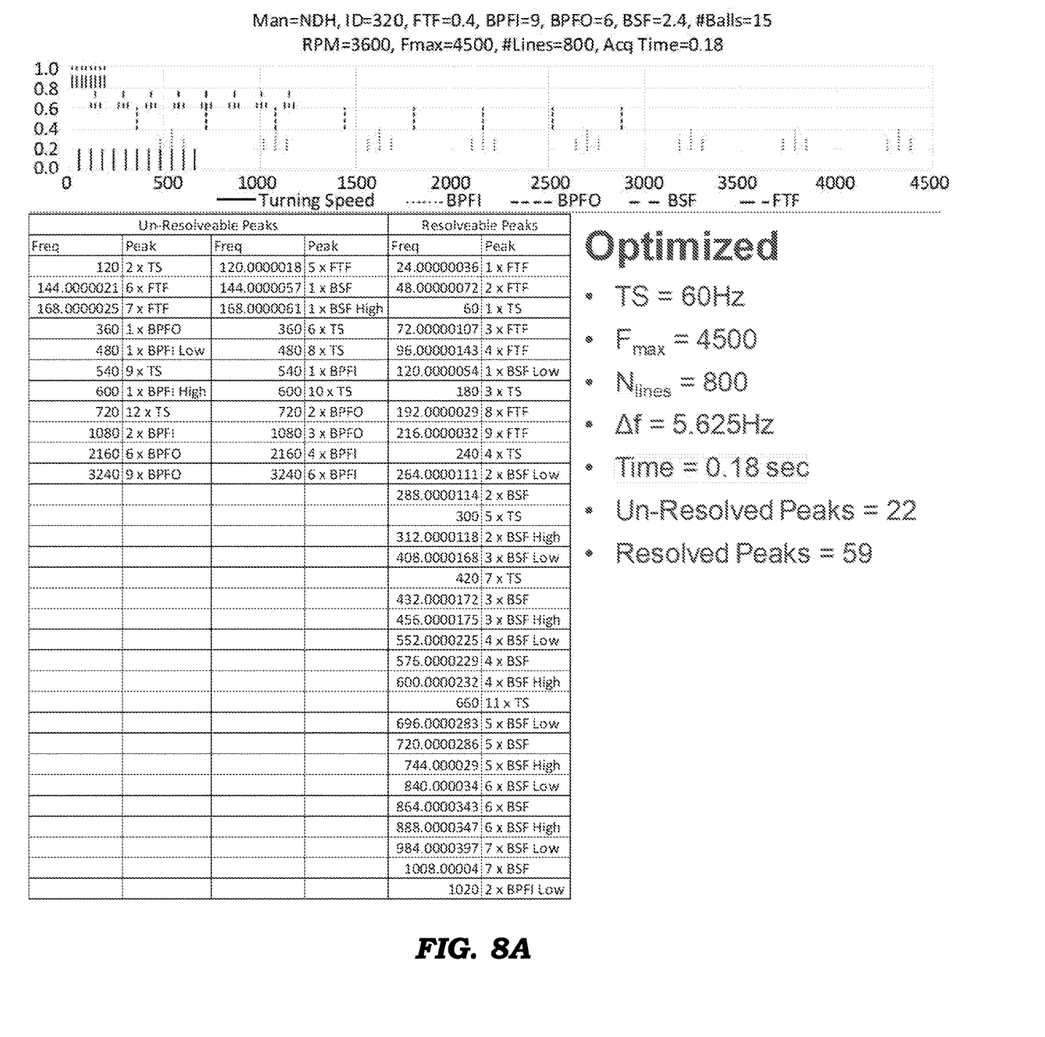
FIGS. 8A and 8B depict a third example illustrating differences in the identification of fault frequency peaks when using an optimized method of determining $F_{max}$ and $N_{lines}$ versus using a "rule of thumb" method.
Figure 8B:
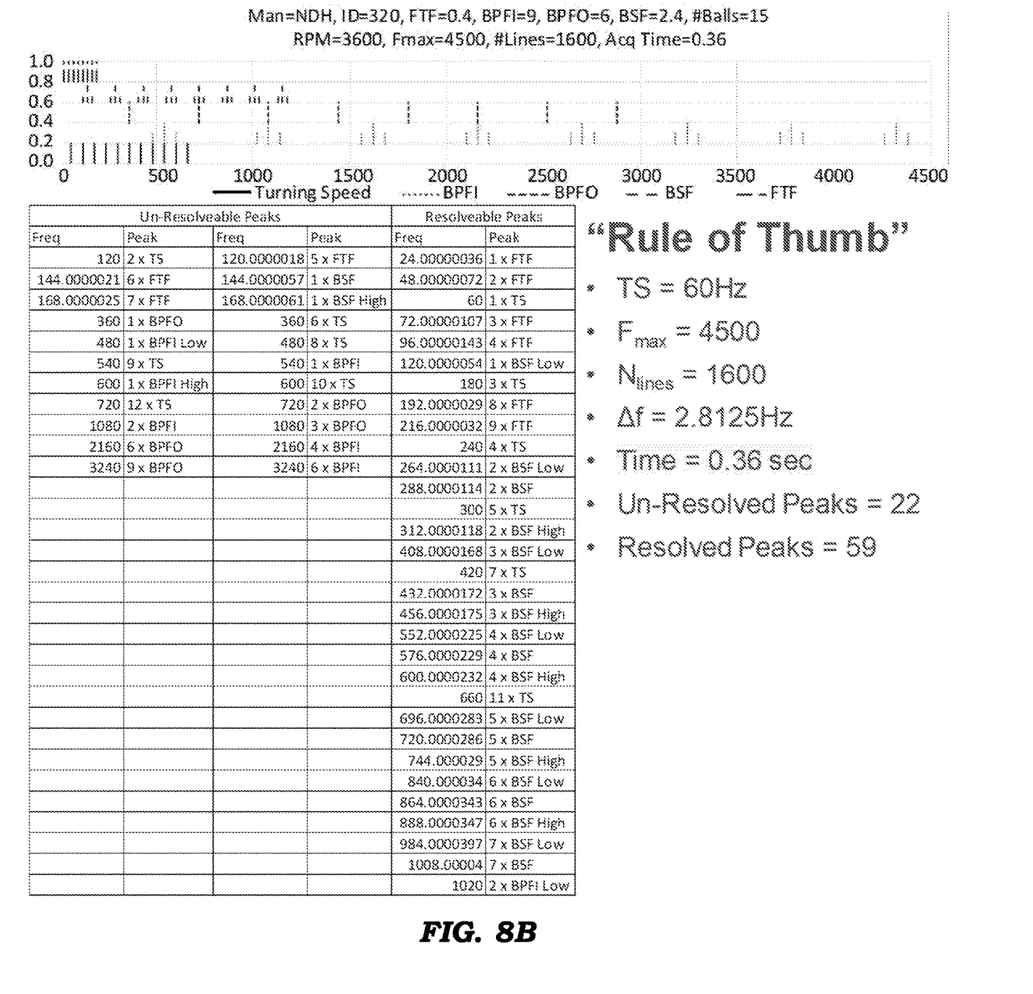

Examples depicted in FIGS. 6A, 6B, 7A, 7B, 8A, and 8B illustrate differences between the optimized method of determining $F_{max}$ and $N_{lines}$ versus the "rule of thumb" method. In the comparing FIG. 6A to FIG. 6B and FIG. 7A to FIG. 7B, note that fewer unresolved peaks result from the optimized approach. In the comparison of FIGS. 8A and 8B, note that a reduced $T_{acq}$ results from the optimized approach.

Optimized Method for Determining $F_{max}$ and $N_{lines}$

Figure 4:
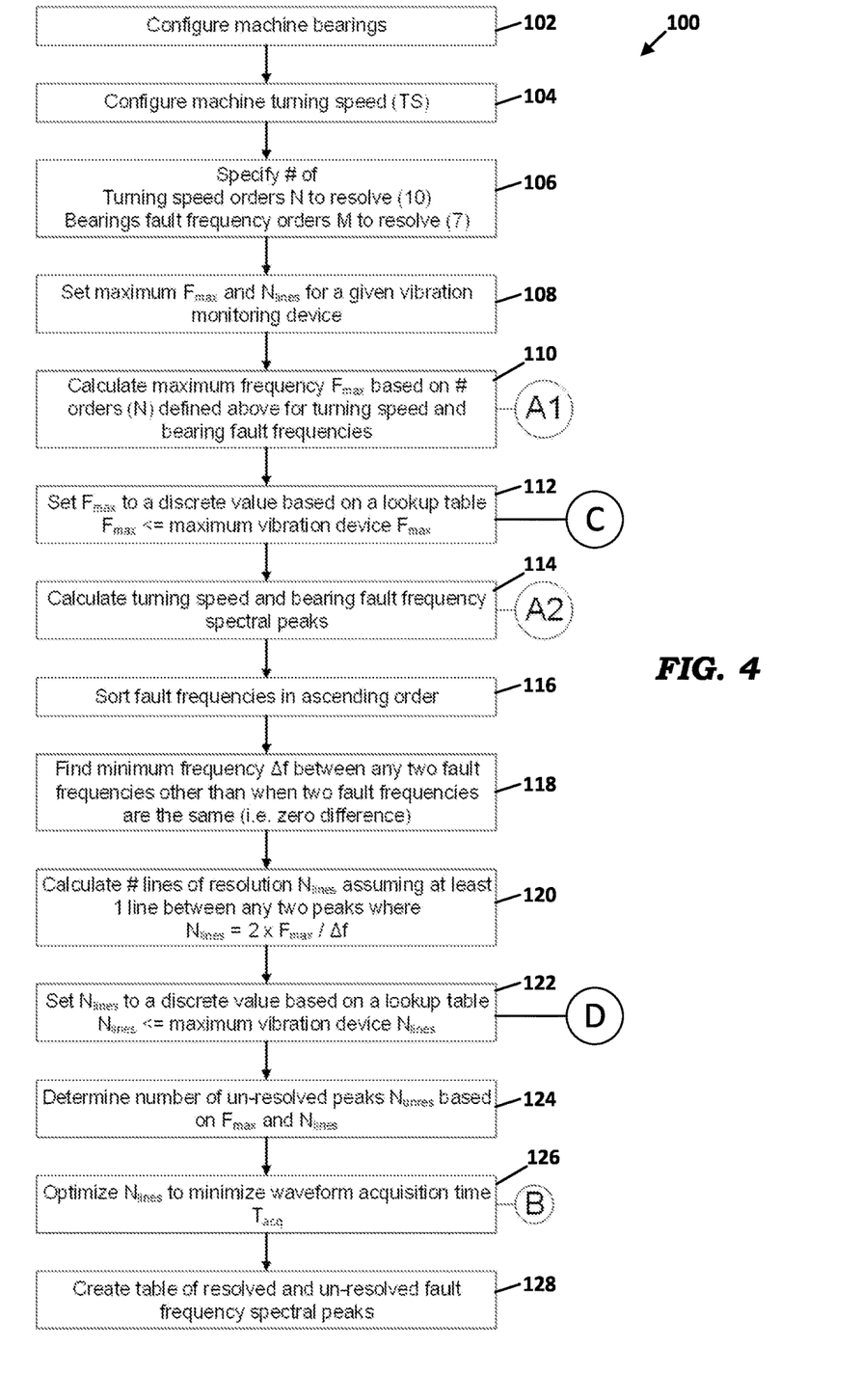
FIGS. 4 and 5A-5D depict a preferred embodiment of a process for determining $F_{max}$ and $N_{lines}$ settings for optimized acquisition of machine vibration waveform data to be used in detecting bearings faults.

FIG. 4 depicts an embodiment of a process for determining $F_{max}$ and $N_{lines}$ settings for optimized acquisition of machine vibration waveform data to be used in detecting bearings faults. The initial configuration of the data acquisition device requires setup of the bearing fault frequencies (step 102) and the machine reference turning speed (TS) (step 104). It will be appreciated that an accurate turning speed is not necessary for this process, as all fault frequencies are proportional to the machine turning speed.

The number of orders (harmonics) N to be resolved for the turning speed and the number of orders (harmonics) M to be resolved for each type of bearing fault frequency (BPFI, BPFO, BSF, FTF) are specified (step 106). The number of orders N for the turning speed is typically set to ten and the number of orders M for the bearing fault frequencies is typically set to seven.

Figure 5A:
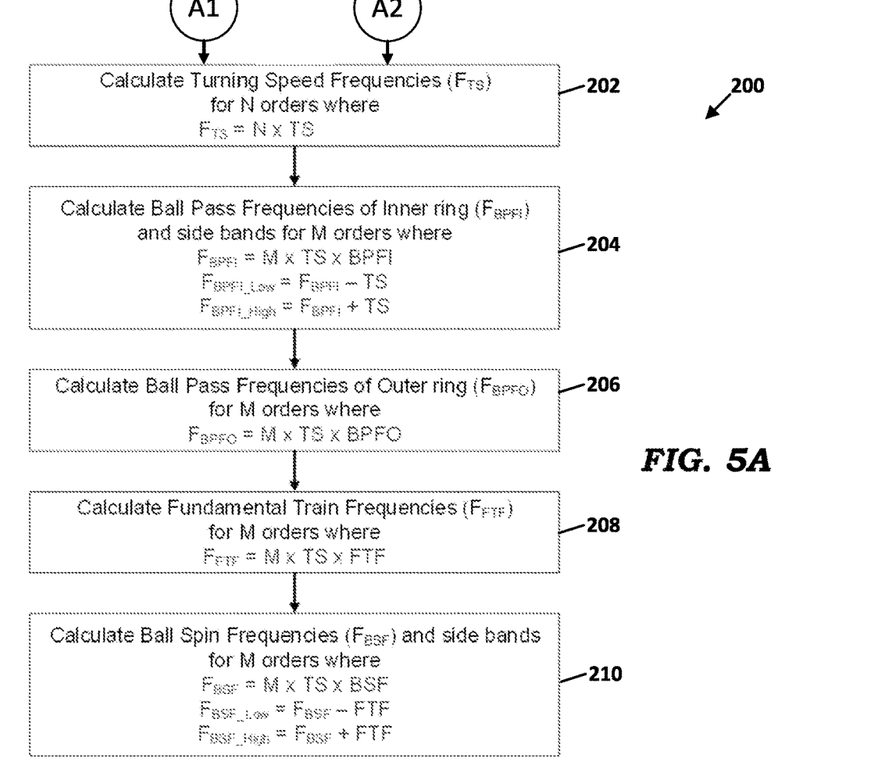

A maximum value of $F_{max}$ and a value for $N_{lines}$ for the data acquisition are then determined for the vibration data collection device (step 108). For $F_{max}$, this first involves execution of steps 202-210 of the process 200 depicted in FIG. 5A for calculating the spectral fault frequencies for only the maximum order (largest values of N and M) of the turning speed ($F_{TS}$) and the various types of bearing fault frequencies ($F_{BPFI}$, $F_{BPFI\_Low}$, $F_{BPFI\_High}$, $F_{BPFO}$, $F_{FTF}$, $F_{BFS}$, $F_{BSF\_Low}$, and $F_{BSF\_High}$) (step 110) as follows:

$$F_{TS} = N \times TS$$

$$F_{BPFI} = M \times TS \times BPFI$$

$$F_{BPFI\_Low} = F_{BPFI} - TS$$

$$F_{BPFI\_High} = F_{BPFI} + TS$$

$$F_{BPFO} = M \times TS \times BPFO$$

$$F_{FTF} = M \times TS \times FTF$$

$$F_{BSF} = M \times TS \times BSF$$

$$F_{BSF\_Low} = F_{BSF} - FTF$$

$$F_{BSF\_High} = F_{BSF} + FTF$$

The value of $F_{max}$ is initially set to the highest one of these calculated fault frequencies.

At step 112 in FIG. 4, a process 400 (depicted in FIG. 5C) is executed that uses the highest of the calculated values of $F_{max}$ to select a discrete value for $F_{max}$ that is compatible with the vibration data collection device. As shown in FIG. 5C, a lookup table is accessed, such as from the device parameter library 26, that lists discrete device-compatible values for $F_{max}$. For example, the lookup table may list discrete values $F_{dis}$ ranging from a maximum of 80 KHz to a minimum of 10 Hz. In a preferred embodiment, the discrete values $F_{dis}$ in the lookup table are sorted in descending order (step 402). The first (highest) $F_{dis}$ value from the lookup table is selected (step 404) and compared to the highest of the calculated values of $F_{max}$ (step 406).

If the highest of the calculated $F_{max}$ values is not greater than or equal to the $F_{dis}$ value from the lookup table at step 406, then the next $F_{dis}$ value from the lookup table is selected (step 408) and compared to the highest of the calculated values of $F_{max}$ (step 406). Steps 408 and 406 are repeated until the highest of the calculated $F_{max}$ values is greater than or equal to the selected $F_{dis}$ value from the lookup table.

If the highest of the calculated $F_{max}$ values is greater than or equal to the $F_{dis}$ value from the lookup table at step 406, then $F_{max}$ is set equal to the selected $F_{dis}$ value from the lookup table (step 410). $F_{max}$ is then compared to the highest discrete maximum frequency value at which the vibration data collection device is capable of operating (step 412). In a preferred embodiment, this highest discrete maximum frequency value may be accessed from the device parameter library 26. If $F_{max}$ is less than or equal to the highest discrete maximum frequency value at which the vibration data collection device is capable of operating, then the process returns to step 114 in FIG. 4 (step 416). If $F_{max}$ is greater than the highest discrete maximum frequency value at which the vibration data collection device is capable of operating, then $F_{max}$ is set to that highest discrete maximum operational frequency value (step 414), and the process returns to step 114 in FIG. 4 (step 416). The final selected value of $F_{max}$ as determined by the process 400 is used in configuring the vibration data collection device.

Continuing at step 114 in FIG. 4, the spectral fault frequencies for multiple orders of the turning speed and the various types of bearing fault frequencies are calculated by execution of steps 202-210 of the process 200 depicted in FIG. 5A, and the fault frequency peaks are sorted in ascending order from the lowest to the highest frequency (step 116).

The minimum frequency spacing $\Delta f$ is then determined between all of the fault frequencies, other than when two fault frequencies coincide (step 118). The value of $\Delta f$ is then used to calculate an initial $N_{lines}$ value according to $$N_{lines} = \frac{2 \times F_{max}}{\Delta f}. \quad \text{(step 120)}$$

At step 122 in FIG. 4, a process 500 (depicted in FIG. 5D) is executed that uses the $N_{lines}$ value calculated at step 120 to select a discrete value for $N_{lines}$ that is compatible with the vibration data collection device. As shown in FIG. 5D, a lookup table is accessed, such as from the device parameter library 26, that lists discrete device-compatible values for $N_{lines}$. For example, the lookup table may list discrete values $N_{dis}$ ranging from a maximum value of 102400 and a minimum value of 100. In a preferred embodiment, the discrete values $N_{dis}$ in the lookup table are sorted in descending order (step 502). The first (highest) $N_{dis}$ value from the lookup table is selected (step 504) and compared to the $N_{lines}$ value calculated at step 120 (step 506).

If the $N_{lines}$ value calculated at step 120 is not greater than or equal to the $N_{dis}$ value from the lookup table at step 506, then the next $N_{dis}$ value from the lookup table is selected (step 508) and compared to the $N_{lines}$ value calculated at step 120 (step 506). Steps 508 and 506 are repeated until the $N_{lines}$ value calculated at step 120 is greater than or equal to the selected $N_{dis}$ value from the lookup table.

If the $N_{lines}$ value calculated at step 120 is greater than or equal to the $N_{dis}$ value from the lookup table at step 506, then $N_{lines}$ is set equal to the selected $N_{dis}$ value from the lookup table (step 510). $N_{lines}$ is then compared to the highest discrete $N_{lines}$ value at which the vibration data collection device is capable of operating (step 512). In a preferred embodiment, this highest discrete $N_{lines}$ value may be accessed from the device parameter library 26. If $N_{lines}$ is less than or equal to the highest discrete $N_{lines}$ value at which the vibration data collection device is capable of operating, then the process returns to step 124 in FIG. 4 (step 516). If $N_{lines}$ is greater than the highest discrete $N_{lines}$ value at which the vibration data collection device is capable of operating, then $N_{lines}$ is set to that highest discrete operational $N_{lines}$ value (step 514), and the process returns to step 124 in FIG. 4 (step 516). The final selected value of $N_{lines}$ as determined by the process 500 is used in configuring the vibration data collection device.

Because $N_{lines}$ and $F_{max}$ have limited ranges due to data collection device limitations, there may be certain fault frequency peaks that cannot be resolved. The number of these unresolved fault frequency spectral peaks ($N_{unres}$) is determined (step 124) and their frequencies are listed in a table along with the frequencies of the resolved fault frequency spectral peaks (step 128). Unresolved peaks are any pair of peaks that do not have at least one line of resolution between them.

Figure 5B:
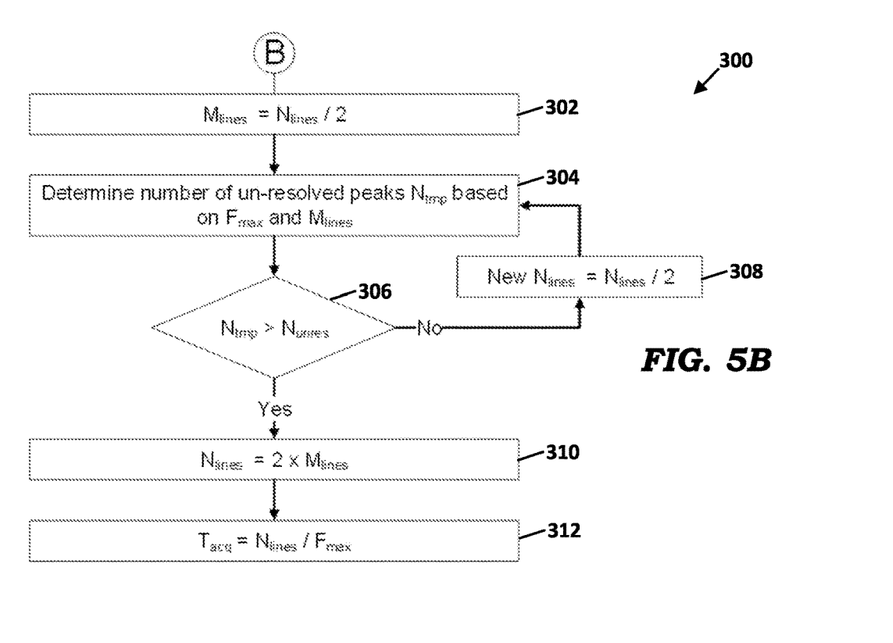
Figure 5C:
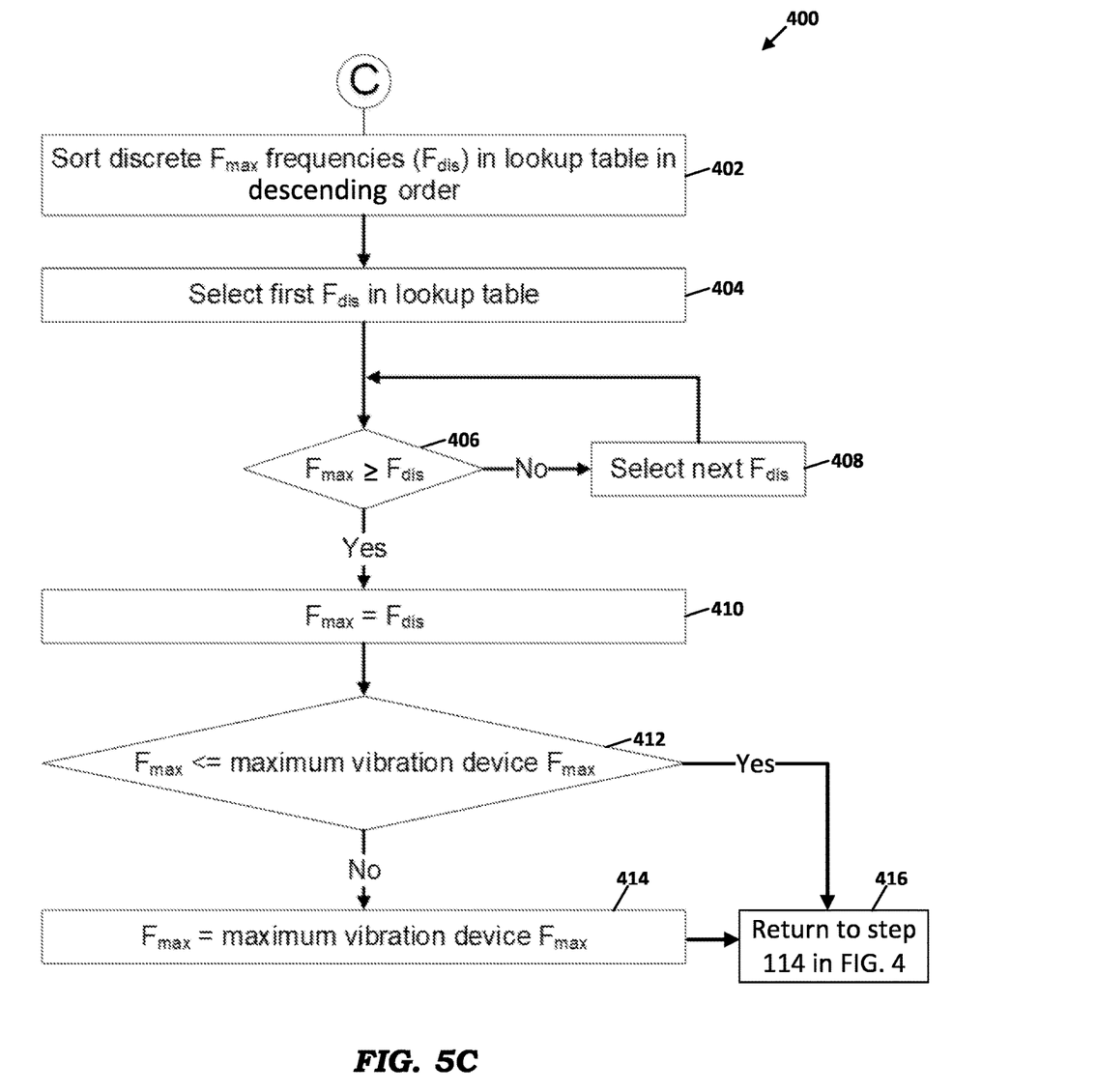
Figure 5D:
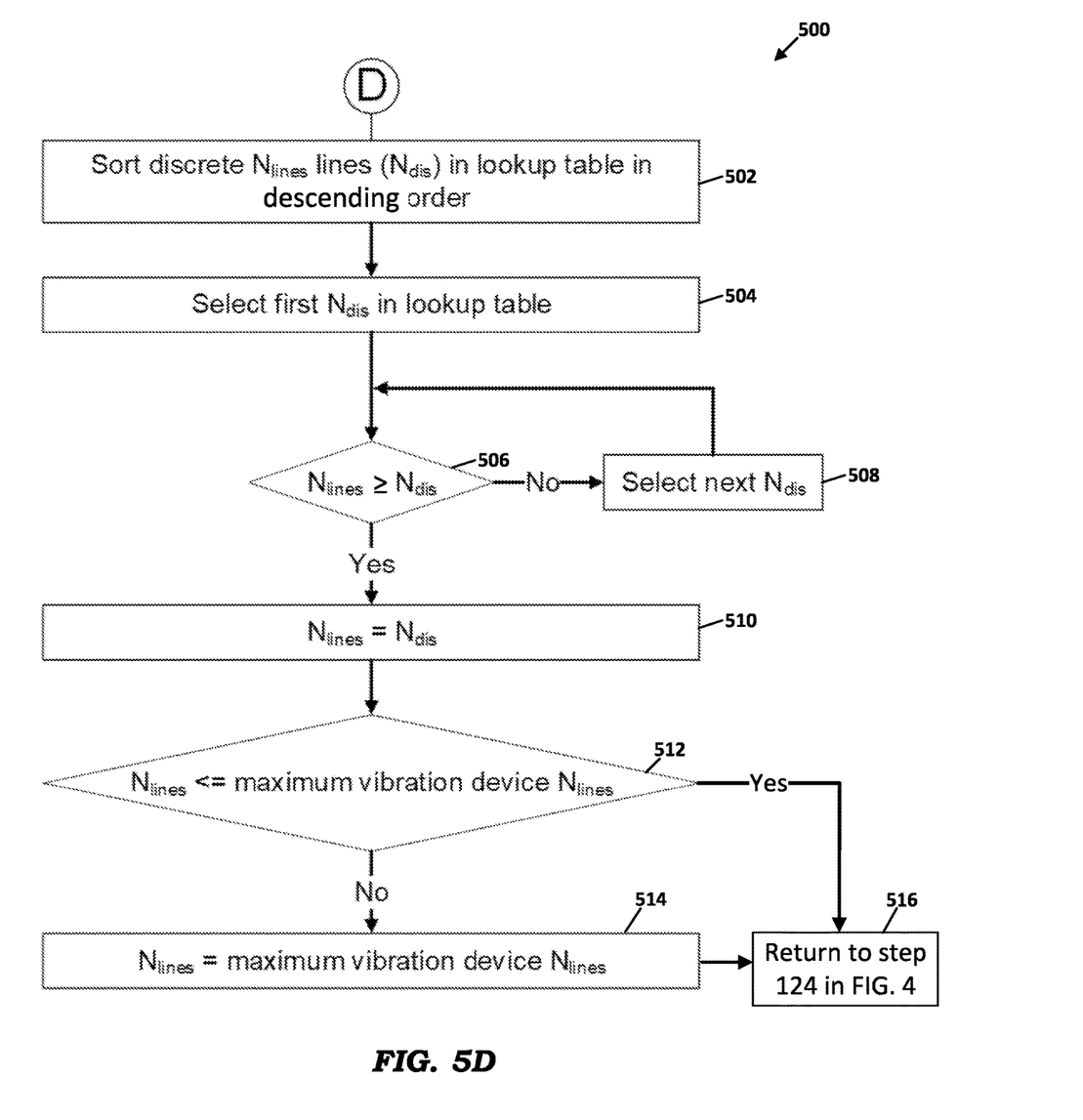
Figure 6A:
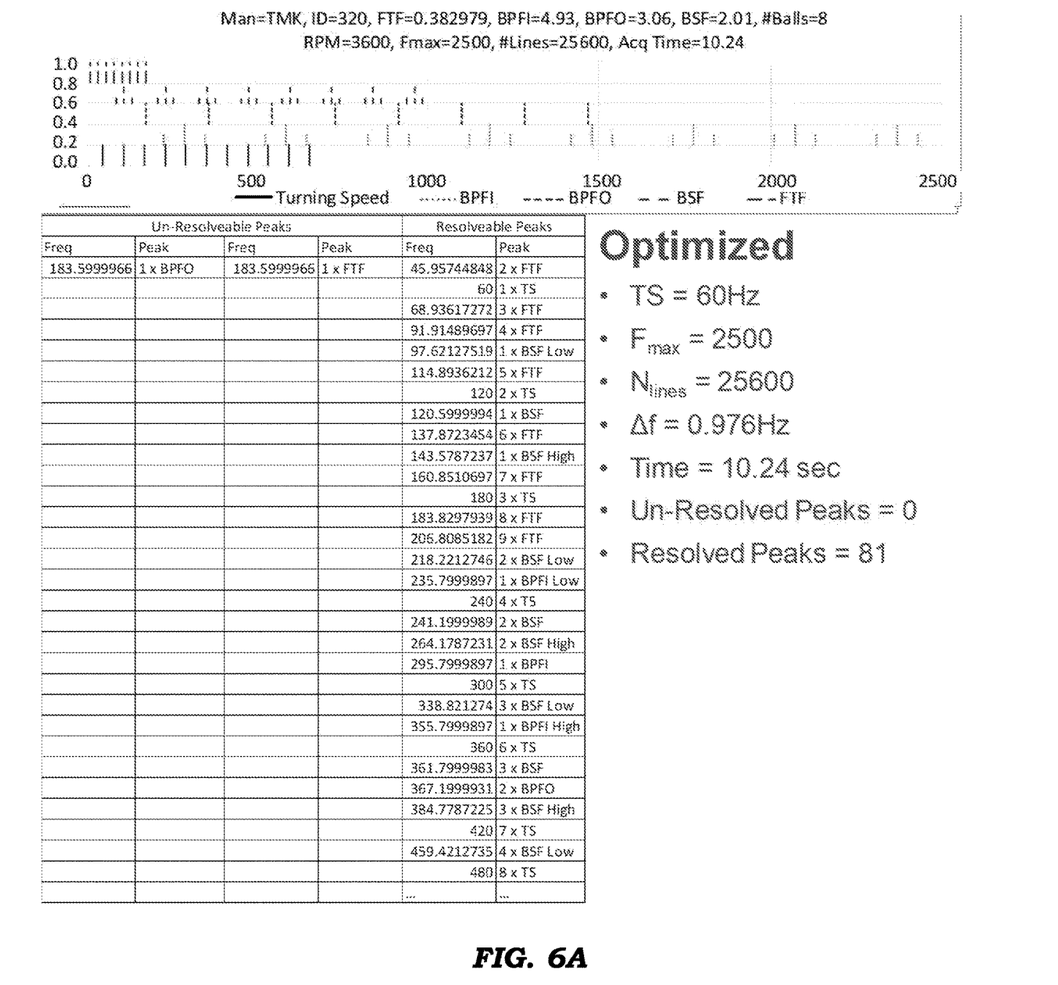
FIGS. 6A and 6B depict a first example illustrating differences in the identification of fault frequency peaks when using an optimized method of determining $F_{max}$ and $N_{lines}$ versus using a "rule of thumb" method.
Figure 6B:
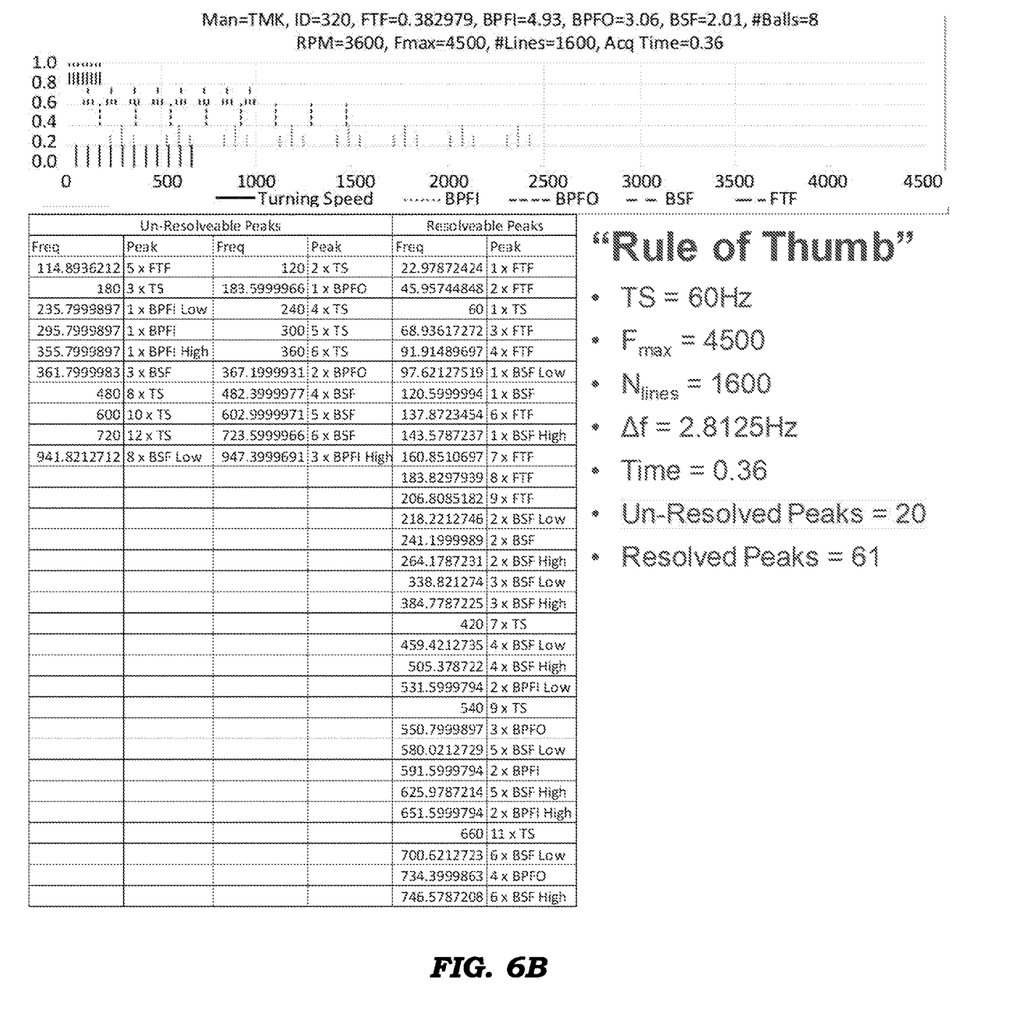
Figure 7A:
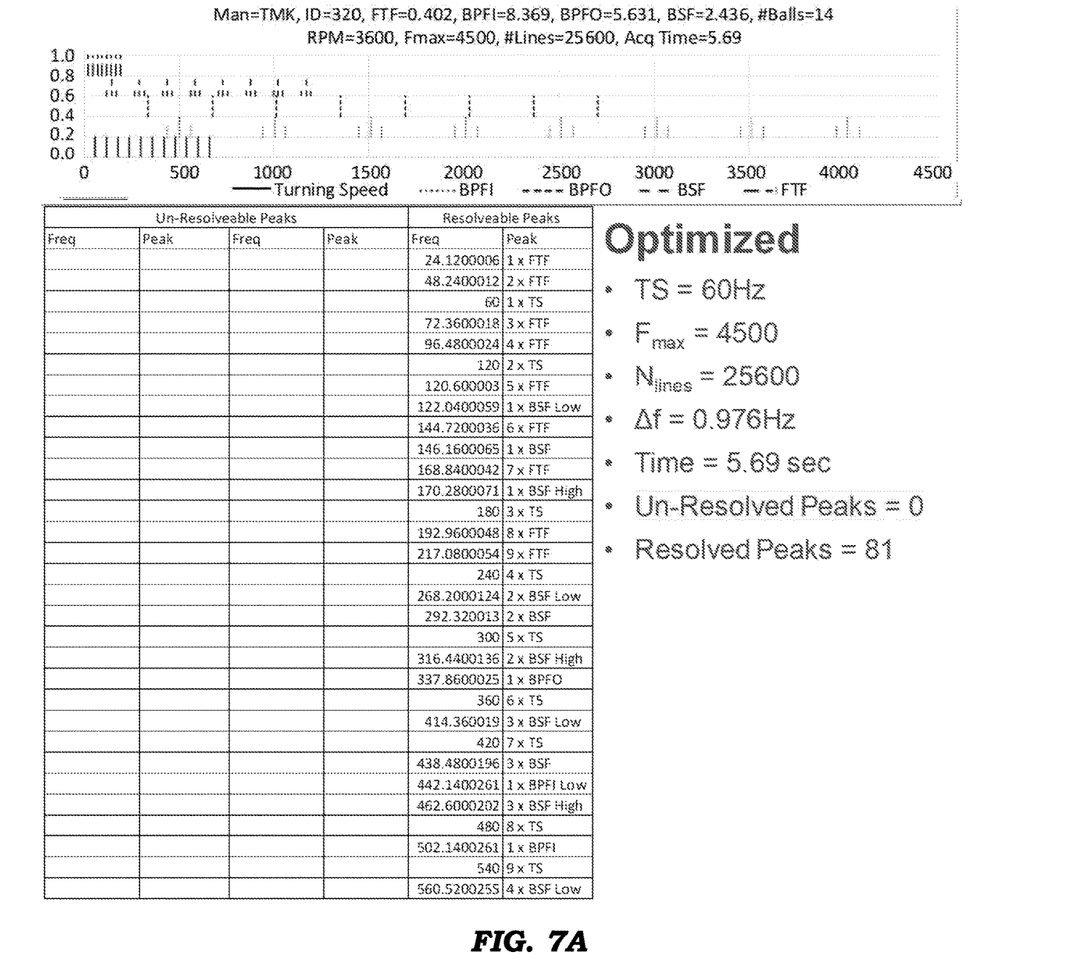
FIGS. 7A and 7B depict a second example illustrating differences in the identification of fault frequency peaks when using an optimized method of determining $F_{max}$ and $N_{lines}$ versus using a "rule of thumb" method.
Figure 7B:
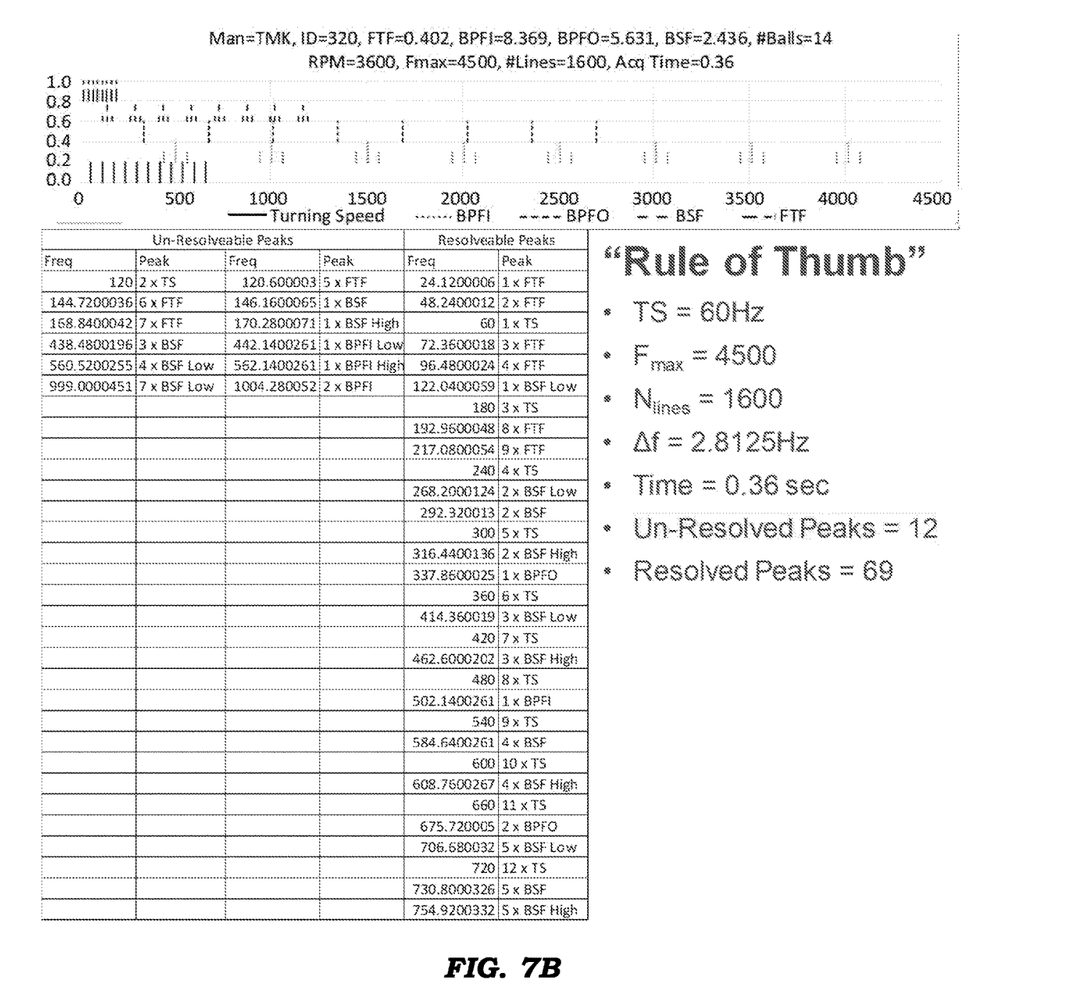

By execution of steps 302-312 of the process 300 depicted in FIG. 5B, a minimum value of $N_{lines}$ is determined that minimizes the waveform acquisition time $T_{acq}$ without increasing the number of unresolvable spectral peaks (step 126). As shown in FIG. 5B, an integer value $M_{lines}$ is determined according to $$M_{lines} = \frac{N_{lines}}{2}. \quad \text{(step 302)}$$

A temporary value for the number of unresolved peaks ($N_{tmp}$) is determined based on $F_{max}$ and $M_{lines}$ (step 304). If $N_{tmp}$ is greater than $N_{unres}$ at step 306, then $$N_{lines} = 2 \times M_{lines}, \text{ and} \quad \text{(step 310)}$$

$$T_{acq} = \frac{N_{lines}}{F_{max}}. \quad \text{(step 312)}$$

If $N_{tmp}$ is not greater than $N_{unres}$ at step 306, then a new value of $N_{lines}$ is set to $$\frac{N_{lines}}{2}$$

(step 308), and the process loops back to step 304. The final value of $T_{acq}$ calculated at step 312 is then used in configuring the vibration data collection device.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method implemented by a computer processor for configuring a vibration data collection device to acquire machine vibration data from a machine for use in generating a vibration spectrum having amplitude peaks at a plurality of fault frequencies that are indicative of faults in the machine, wherein the machine includes components that rotate at a turning speed, the method comprising the following steps performed prior to acquiring the machine vibration data using the vibration data collection device:
   (a) specifying a number N of harmonics of the turning speed and a number M of harmonics of the plurality of fault frequencies to be included in the vibration spectrum;
   (b) calculating N number of turning speed frequencies associated with the N number of harmonics of the turning speed;
   (c) calculating M number of fault frequencies associated with the M number of harmonics of the plurality of fault frequencies;
   (d) determining a maximum frequency of data collection based at least in part on a highest frequency of the N number of turning speed frequencies and the M number of fault frequencies;
   (e) determining a minimum frequency spacing within the N number of turning speed frequencies and the M number of fault frequencies;
   (f) based on the maximum frequency and the minimum frequency spacing, determining a number of lines of resolution that will allow identification of all of the amplitude peaks associated with each of the plurality of fault frequencies that are resolvable given limitations of the vibration data collection device; and
   (g) configuring the vibration data collection device using the maximum frequency and the number of lines of resolution.

2. The method of claim 1 wherein step (d) further comprises:
   (d1) accessing from a memory device a list of discrete maximum frequency values at which the vibration data collection device is operable;
   (d2) comparing one or more of the discrete maximum frequency values to the highest frequency of the N number of turning speed frequencies and the M number of fault frequencies;
   (d3) based on the comparing of step (d2), determining a largest one of the discrete maximum frequency values that is less than or equal to the highest frequency of the N number of turning speed frequencies and the M number of fault frequencies; and
   (d4) setting the maximum frequency to be equal to the largest one of the discrete maximum frequency values determined in step (d3).

3. The method of claim 2 wherein step (d) further comprises:
   (d5) accessing the memory device to determine a device maximum frequency value at which the vibration data collection device is operable;
   (d6) comparing the device maximum frequency value to the maximum frequency set in step (d4); and
   (d7) if the maximum frequency set in step (d4) is greater than the device maximum frequency value, setting the maximum frequency to be equal to the device maximum frequency value.

4. The method of claim 3 wherein, if the maximum frequency is set to be equal to the device maximum frequency value, the method includes:
   determining a number of amplitude peaks associated with unresolved fault frequencies based on the maximum frequency and the number of lines of resolution; and
   generating a listing of the amplitude peaks associated with unresolved fault frequencies.

5. The method of claim 1 wherein step (f) comprises calculating $$N_{lines} = \frac{2 \times F_{max}}{\Delta f},$$

where $N_{lines}$ is a calculated number of lines of resolution, $F_{max}$ is the maximum frequency, and $\Delta f$ is the minimum frequency spacing.

6. The method of claim 5 wherein step (f) further comprises:
   (f1) accessing from a memory device a list of discrete number of lines of resolution values at which the vibration data collection device is operable;
   (f2) comparing one or more of the discrete number of lines of resolution values to the calculated number of lines of resolution;
   (f3) based on the comparing of step (f2), determining a largest one of the discrete number of lines of resolution values that is less than or equal to the calculated number of lines of resolution; and
   (f4) setting the number of lines of resolution to be equal to the largest one of the discrete number of lines of resolution values determined in step (f3).

7. The method of claim 6 wherein step (f) further comprises:
   (f5) accessing the memory device to determine a device maximum number of lines of resolution value at which the vibration data collection device is operable;
   (f6) comparing the device maximum number of lines of resolution value to the number of lines of resolution set in step (f4); and
   (f7) if the number of lines of resolution set in step (f4) is greater than the device maximum number of lines of resolution value, setting the number of lines of resolution to be equal to the device maximum number of lines of resolution value.

8. The method of claim 7 wherein, if the number of lines of resolution is set to be equal to the device maximum number of lines of resolution value, the method includes:
   determining a number of amplitude peaks associated with unresolved fault frequencies based on the maximum frequency and the number of lines of resolution; and
   generating a listing of the amplitude peaks associated with unresolved fault frequencies.

9. The method of claim 1 further comprising determining a minimum waveform data acquisition time, which is a smallest amount of time during which the vibration data collection device can acquire vibration data without increasing a number of amplitude peaks associated with unresolved fault frequencies.

10. The method of claim 9 wherein the minimum waveform data acquisition time is calculated according to $$T_{acq} = \frac{N_{lines}}{F_{max}},$$

where, $T_{acq}$ is the minimum waveform data acquisition time, $N_{lines}$ the number of lines of resolution, and $F_{max}$ is the maximum frequency.

11. The method of claim 9 wherein the minimum waveform data acquisition time is determined by:
   (h) determining a value $M_{lines}$ according to $$M_{lines} = \frac{N_{lines}}{2},$$

where $N_{lines}$ is the number of lines of resolution;
   (i) based on the value $N_{lines}$ and the maximum frequency, determining a temporary value $N_{tmp}$ for the number of amplitude peaks associated with unresolved fault frequencies $N_{unres}$;
   (j) if $N_{tmp}$ is greater than $N_{unres}$, then
      setting $N_{lines}$ equal to $2 \times M_{lines}$, and
      determining the minimum waveform data acquisition time $T_{acq}$ according to $$T_{acq} = \frac{N_{lines}}{F_{max}},$$

and
   if $N_{tmp}$ is not greater than $N_{unres}$, then
   setting $N_{lines}$ equal to $$\frac{N_{lines}}{2},$$

and
   repeating steps (i) and (j) until $N_{tmp}$ is greater than $N_{unres}$; and (k) configuring the data collection device using the minimum waveform data acquisition time.

12. The method of claim 1 further comprising generating a graphic display of the N number of turning speed frequencies and the M number of fault frequencies.

13. The method of claim 1 wherein the computer processor is a component of the data collection device.

14. A method implemented by a computer processor for configuring a vibration data collection device to acquire machine vibration data from a machine for use in generating a vibration spectrum having amplitude peaks at a plurality of fault frequencies that are indicative of faults in the machine, wherein the machine includes components that rotate at a turning speed, the method comprising the following steps performed prior to acquiring the machine vibration data using the vibration data collection device:
   (a) determining a maximum frequency of data collection;
   (b) determining a minimum frequency spacing within the plurality of fault frequencies;
   (c) based on the maximum frequency and the minimum frequency spacing, determining a number of lines of resolution of data collection according to $$N_{lines} = \frac{2 \times F_{max}}{\Delta f},$$

where $N_{lines}$ is a calculated number of lines of resolution, $F_{max}$ is the maximum frequency, and $\Delta f$ is the minimum frequency spacing;
   (d) configuring the vibration data collection device using the maximum frequency and the number of lines of resolution;
   (e) determining a minimum waveform data acquisition time $T_{acq}$ according to $$T_{acq} = \frac{N_{lines}}{F_{max}};$$

and
   (f) configuring the vibration data collection device using the maximum frequency, the number of lines of resolution, and the minimum waveform data acquisition time.

* * * * *